(12) United States Patent
Martin et al.

(10) Patent No.: US 11,764,469 B2
(45) Date of Patent: Sep. 19, 2023

(54) TETRAHEDRAL ARRAY FOR CONSTANT GAIN HEMISPHERICAL COVERAGE

(71) Applicant: SPECIALIZED ARRAYS, INC., Indialantic, FL (US)

(72) Inventors: G. Patrick Martin, Merritt Island, FL (US); Kathleen Marie Minear, Palm Bay, FL (US)

(73) Assignee: SPECIALIZED ARRAYS, INC., Indialantic, FL (US)

( * ) Notice: Subject to any disclaimer, the term of this patent is extended or adjusted under 35 U.S.C. 154(b) by 321 days.

(21) Appl. No.: 17/116,287

(22) Filed: Dec. 9, 2020

(65) Prior Publication Data

US 2021/0173068 A1 Jun. 10, 2021

Related U.S. Application Data

(60) Provisional application No. 62/945,612, filed on Dec. 9, 2019.

(51) Int. Cl.
*H01Q 3/26* (2006.01)
(52) U.S. Cl.
CPC ................................ *H01Q 3/2682* (2013.01)
(58) Field of Classification Search
CPC ......... H01Q 3/2682; G01S 7/03; G01S 13/42; G01S 13/87; G01S 13/91; G01S 2013/0245
See application file for complete search history.

(56) References Cited

U.S. PATENT DOCUMENTS

| | | | | |
|---|---|---|---|---|
| 4,617,573 A | * | 10/1986 | Davidson | H01Q 5/40 343/844 |
| 6,292,134 B1 | * | 9/2001 | Bondyopadhyay | H01Q 21/205 342/374 |
| 6,456,244 B1 | * | 9/2002 | Goldstein | H01Q 21/0087 343/700 MS |
| 2006/0238434 A1 | * | 10/2006 | Parsche | H01Q 23/00 343/795 |
| 2013/0335269 A1 | * | 12/2013 | Culkin | G01S 13/4463 342/371 |
| 2014/0104107 A1 | * | 4/2014 | Mangenot | H01P 11/00 343/893 |

\* cited by examiner

*Primary Examiner* — Ab Salam Alkassim, Jr.
*Assistant Examiner* — Leah Rosenberg
(74) *Attorney, Agent, or Firm* — Jacob M. Ward; Ward Law Office LLC

(57) ABSTRACT

The trirectangular tetrahedron array provides nearly constant gain over a hemisphere, by adaptively combining signals from elements, having substantially cosine-squared power patterns, on orthogonal faces. By using a deterministic aperiodic lattice, the array can use higher gain elements rather than lower gain elements for traditional wide-scan phased arrays. Thus, the number of elements needed can be reduced by more than a factor of two. Importantly, element spacing is increased with this design, thus lowering mutual coupling and the associated potential for scan blindness. Higher gain elements require spacing exceeding ½ wavelength can have grating lobes. This is addressed with an aperiodic lattice designed to ensure that no grating lobe can form. By connecting two trirectangular tetrahedrons by their bases and mounting on an air/space-based platform, nearly spherical coverage with constant gain results.

20 Claims, 13 Drawing Sheets

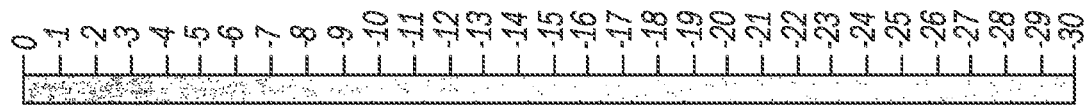
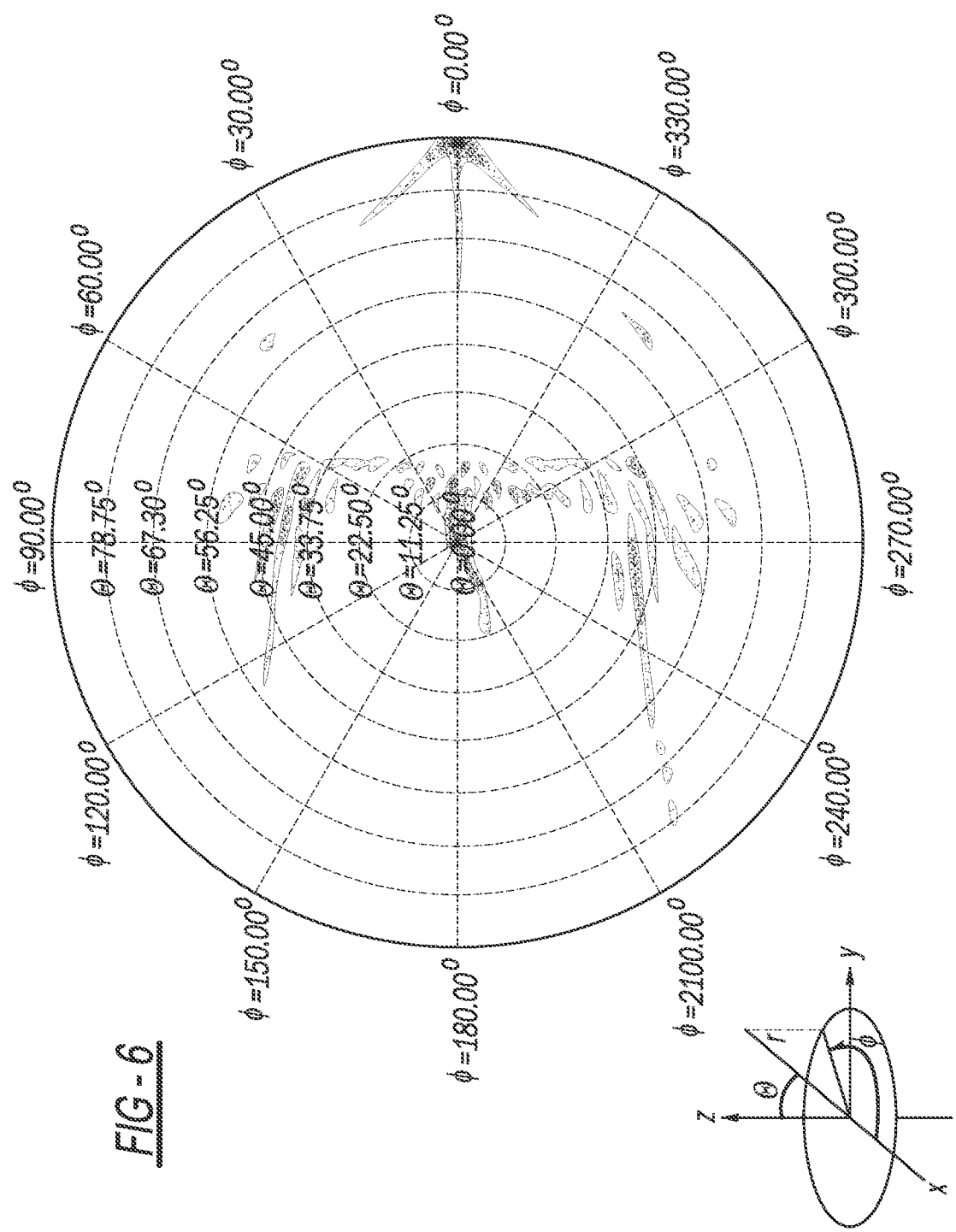
FIG-6 ered to the present disclosure are possible, and practical examples are discussed in further detail.

TETRAHEDRAL ARRAY FOR CONSTANT GAIN HEMISPHERICAL COVERAGE

CROSS-REFERENCE TO RELATED APPLICATIONS

This application claims the benefit of U.S. Provisional Application. No. 62/945,612 filed on Dec. 9, 2019. The entire disclosure of the above application is incorporated herein by reference.

FIELD

The present disclosure relates to monitoring and responding to signals within a hemispherical space, more particularly, to an array system and method for monitoring and responding to signals within a hemispherical space. Example applications relate to SIGnal INTelligence (SIGINT), tracking and response.

INTRODUCTION

This section provides background information related to the present disclosure which is not necessarily prior art.

Within the intelligence, defense and space industries, there is frequently a need to monitor a wide region of space for signals of interest without knowing their direction or angle of arrival (AOA). However, monitoring a wide region of space can create several problems. In particular, monitoring a wide region of space usually comes with the disadvantage of having reduced antenna gain. Reduced antenna gain can result in reduced system sensitivity to detect and respond to weak signals. However, higher antenna gain necessarily reduces the spatial field of view. Therefore, there is a need for a means to provide a very wide field of view, e.g., hemispherical, simultaneous with high antenna gain.

There are many applications for a hemispherical or very wide field of view, constant high gain phased arrays. For example, in radar-mode, a system with both a transmit and receive hemispherical field of view phased array could utilize its 360° coverage to monitor an area of interest 24/7. The constant hemispherical gain would provide optimum sensitivity, regardless of threat direction of arrival. In another example, for a transponder application, a hemispherical field of view phased array could receive the signal, amplify, frequency translate, then transmit it to a facility or platform of interest. For SIGINT applications, a very wide field of view reduces the likelihood of missing a signal. All of these applications would benefit from the advantages of digital arraying (versus analog) in order to form beams in any directions adaptively and simultaneously.

There is a continuing need for an array system and method that provides substantially constant gain with hemispherical coverage. Desirably, the system and method can be used for multiple defense and space-related applications.

SUMMARY

In concordance with the instant disclosure, an array system and method that provides substantially constant gain with hemispherical coverage, and which can be used for multiple defense and space-related applications, has been surprisingly discovered.

In certain embodiments, systems for monitoring a hemispherical space can have a first sensor array. The first sensor array can include a first face and a second face. The first face can be disposed orthogonal to the second face. The first face can have a plurality of first elements. The first elements can be arranged in a first aperiodic lattice. Each of the first elements can include a first substantially cosine-squared power pattern. The second face can have a plurality of second elements. The second elements can be arranged in second aperiodic lattice. Each of the second elements can include a second substantially cosine-squared power pattern. The first sensor array can be configured to provide a nearly constant gain across an edge of the first face and the second face. The hemispherical coverage can be about two-thirds of the hemispherical space if the first face and the second face are optimally combined.

In certain embodiments, systems for monitoring a hemispherical space can have a first sensor array. The first sensor array can have a trirectangular tetrahedron configuration. The trirectangular tetrahedron configuration can include a first face, a second face, and a third face. The first face can have a plurality of first elements. The plurality of first elements can be arranged in a first aperiodic lattice. The second face can be disposed orthogonal to the first face. The second face can have a plurality of second elements. The plurality of second elements can be arranged in a second aperiodic lattice. The third face can be disposed orthogonal to the first face and the second face. The third face can have a plurality of third elements. The plurality of third elements can be arranged in a third aperiodic lattice. Each of the first elements, the second elements, and the third elements can have an antenna pattern. The antenna pattern can be expressed in terms of a polar angle θ and a polar angle ϕ, whereby the viewing zenith angle is shown by θ and the azimuth is shown by ϕ. Each of the first elements can have a $\cos^2(\theta)$ power pattern. Each of the second elements can include a $$\cos^2\left(\theta - \frac{\pi}{2}\right)$$

power pattern relative to each of the first elements of the first face. The first face, the second face, and the third face can be optimally combined to provide a nearly constant gain with nearly hemispherical coverage. By nearly hemispherical coverage, it is understood that coverage can include substantially an entire hemisphere. For example, nearly hemispherical coverage can include just less than an entire hemisphere in coverage.

While this disclosure can be used to monitor the hemispherical space of Earth, it should be appreciated that the present technology can be applied to other defense and space-related industry tasks. For example, in SIGINT applications, signals from any elevation or azimuth direction can be simultaneously detected and characterized with just a single tetrahedral radar phased array. For EW application, a threat signal can be mitigated, with the transmit unit acting as a jammer. For radar surveillance applications objects can be detected and imaged.

Further areas of applicability will become apparent from the description provided herein. It should be understood that the description and specific examples are intended for purposes of illustration only and are not intended to limit the scope of the present disclosure.

This design can be extended by placing two trirectangular tetrahedrons, base-to-base. Even though side face edges do not meet at orthogonal angles, they continue to combine significantly, thus providing spherical coverage although not exactly constant gain. This implementation can be applicable to air platforms where the need for monitoring from zenith to 180 degrees is desired. This double, trirectangular tetrahedron would provide nearly spherical coverage.

DRAWINGS

The above, as well as other advantages of the present disclosure, will become readily apparent to those skilled in the art from the following detailed description, particularly when considered in the light of the drawings described herein.

FIG. 6 is a 3D polar graph showing the array pattern of the system, according to one embodiment, and further showing the peak at 0° from zenith and an azimuth of 0°;

DETAILED DESCRIPTION

Figure 1A:
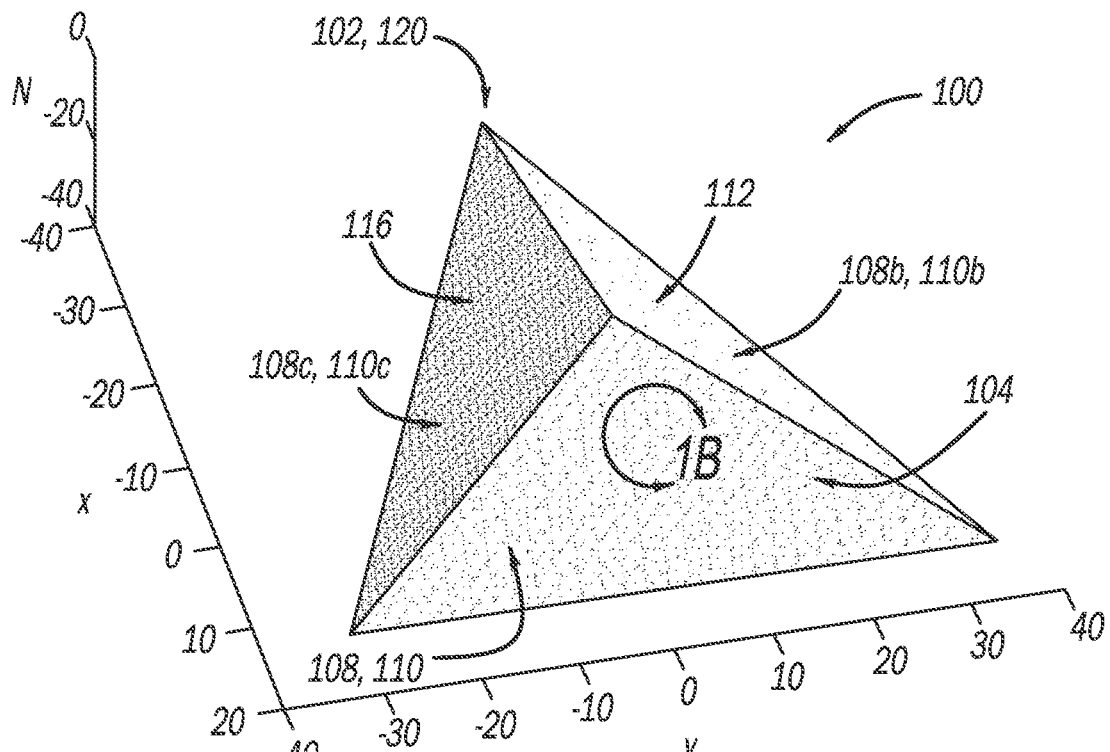
FIG. 1A is a top plan view illustrating one embodiment of a system for monitoring the hemispherical space of Earth, the system including a first face, a second face, and a third face arranged in a trirectangular tetrahedron.

The following description of technology is merely exemplary in nature of the subject matter, manufacture, and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application.

With reference to FIG. 1, a system 100 for monitoring a hemispherical space is shown. In certain examples, the system 100 can be located on Earth. However, it should be appreciated that the system 100 can be located at different location according to the requirements of a given application. Other non-limiting examples include an airborne platform, a natural satellite (e.g., the Moon), and different planets. The system 100 can include a first sensor array 102. It should be appreciated that a skilled artisan can employ more arrays for the system 100, as desired. The first sensor array 102 can be configured to receive incoming signals and transmit outgoing signals. The first sensor array 102 can also be configured for a multitude of different applications. Non-limiting examples include radar, sonar, satellite communication, and mobile communication. However, it should be appreciated that other uses are also contemplated, within the scope of this disclosure.

Figure 2:
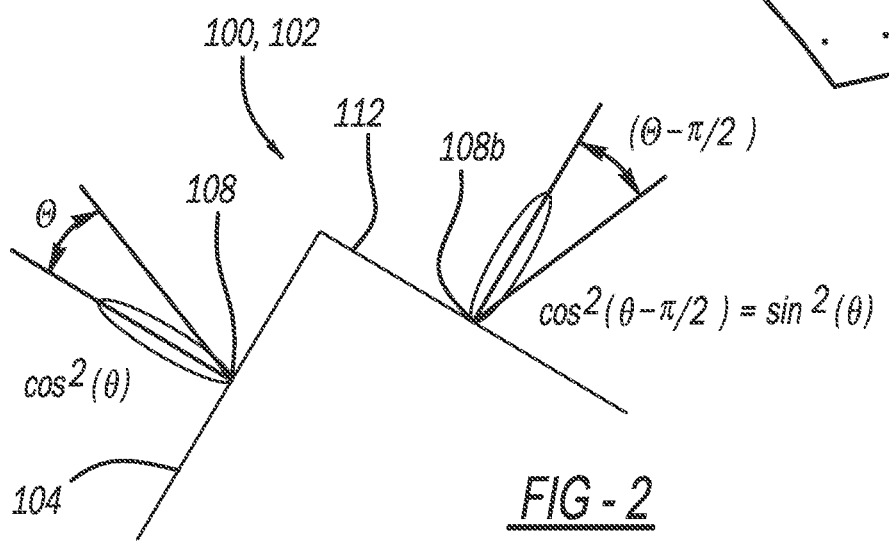
FIG. 2 is a top plan view of the first face disposed orthogonal to the second face, and further showing a cosine-squared element power pattern.

The first sensor array 102 can provide a hemispherical coverage. The hemispherical coverage defines how much space the system 100 can cover. The first sensor array 102 can include a first face 104. The first face 104 can have a plurality of first elements 108. The plurality of first elements 108 can include antenna elements. For generality, the plurality of first elements 108 can be considered to be dual polarization; the following discussion presumes that one skilled in the art understands that these are similarly processed and combined as appropriate in beam formation and optimal combining. The plurality of first elements 108 can be configured to be receiving elements, transmitting elements, or a combination thereof. Each of the plurality of first elements 108 can include a first substantially cosine-squared power pattern, as shown in FIG. 2. Each of the plurality of elements can have an antenna pattern. One can express the antenna pattern, mathematically, in terms of polar angles, θ and φ, whereby θ is viewing zenith angle and φ is azimuth. In certain examples, the plurality of first elements 108 can have a $\cos^2(\theta)$ power pattern. Desirably, it has been shown that the $\cos^2(\theta)$ power pattern can be useful in obtaining nearly constant gain for antenna array applications when combined with additional faces, as will be discussed in more detail below.

The arrangement of the plurality of first elements 108 in a particular lattice has been considered for the present technology. The effective area $A_e$ of an element with gain $G_e$ in square wavelengths is:

$$\frac{A_e}{\lambda^2} = \frac{G_e}{4\pi}$$

With an upper hemisphere $\cos^2(\theta)$ element over a ground plane or unidirectional cosine square element gain of 6, we see that:

$$\frac{A_e}{\lambda^2} = 0.477$$

For a circular element, this corresponds to a diameter of about 0.78 wavelengths. With a periodic lattice, at some scan angles, grating lobes form if the element spacing is greater than half (0.5) a wavelength. This issue can be addressed by arranging the plurality of first elements 108 in a first aperiodic lattice 110, like shown in FIG. 1B. In certain examples, the first aperiodic lattice 110 is a deterministic aperiodic lattice 110, compared to a traditional random aperiodic lattice. In other instances, the first aperiodic lattice 110 is a random aperiodic lattice 110. This can include deliberate or random suppression of undesired lobes. Advantageously, this can allow for higher gain elements to be packed together without resulting in substantial grating lobes. It is known that the gain of an array is proportional to the number of elements times the gain per element. The system 100, through the use of the deterministic aperiodic lattice 110, can achieve higher gain elements (e.g., 7.78 db gain) rather than lower gain elements for traditional widescan phased arrays (e.g., 4.5 db gain). Desirably, this can equate to an improvement of about 3.2 db compared to traditional wide-scan phased arrays. It should be appreciated that other improvements and adjustments can further increase the efficiency of the system 100. The deterministic aperiodic lattice 110 can also permit the number of the plurality of first elements 108 for a given requirement to be reduced by more than a factor of two because of the higher gain per element. It should be appreciated that one skilled in the art can optimize and adjust the deterministic aperiodic lattice 110 to allow for more of a reduction in the number of the plurality of first elements 108 required for a given application.

The deterministic aperiodic lattice 110 can allow for increased element spacing, which can lower mutual coupling and the associated potential for scan blindness. Irregular mutual coupling keeps an average element voltage standing wave ratio (VSWR) and beam steering errors low. If the element is wideband, then one (e.g., 10 GHz to 20 GHz) to possibly two octaves of operation is feasible. This has shown to be an improvement of the standard traditional phased array, which typically can only provide 20% bandwidth (e.g., 10 GHz to 12 GHz). It should be appreciated that a skilled artisan can optimize and adjust the system 100 to permit even more frequency coverage, within the scope of this disclosure.

The first sensor array 102 can also include a second face 112. The second face 112 can include a plurality of second elements 108b. The plurality of second elements 108b can be identical or similar in structure and/or function to the plurality of first elements 108. The plurality of second elements 108b can be arranged in a second aperiodic lattice 110b. The second aperiodic lattice 110b can be identical or similar in structure and/or function to the first aperiodic lattice 110. Each of the second elements 108b can include a second substantially cosine-squared power pattern. The second substantially cosine-squared power pattern can be identical or similar to the first substantially cosine-squared power pattern. In certain examples, the second face 112 is disposed approximately at a right angle with respect to the first face 104, or in other words the second face 112 can be disposed orthogonal to the first face 104. With this configuration, each of the second elements 108b can nave a $$\cos^2\left(\theta - \frac{\pi}{2}\right)$$

power pattern, or equivalently a $\sin^2(\theta)$ power pattern, with respect to each of the first elements 108 of the first face 104, as shown in FIG. 2. One can appreciate the potential of combining the first face 104 and the second face 112 to obtain constant gain with respect to θ, since $\cos^2(\theta)+\sin^2(\theta)=1$. Advantageously, this can permit the first sensor array 102 to provide a substantially constant gain by utilizing the first face 104 and the second face 112. In certain examples, where the first sensor array 102 includes the first face 104 and the second face 112, the hemispherical coverage is nearly two-thirds of the hemispherical space.

The first sensor array 102 can also include a third face 116. The third face 116 can have a plurality of third elements 108c. The plurality of third elements 108c can be identical or similar in structure and/or function to the plurality of first elements 108. The plurality of third elements 108c can be arranged in a third aperiodic lattice 110c. The third aperiodic lattice 110c can be identical or similar in structure and/or function to the first aperiodic lattice 110. Each of the third elements 108c can include a third substantially cosine-squared power pattern. The third substantially cosine-squared power pattern can be identical or similar to the first substantially cosine-squared pattern and the second substantially cosine-squared power pattern. The third face 116 can be disposed orthogonal to the first face 104 and the third face 116. If the azimuthal response of the element is constant (as with a spiral or helix element), then it can be shown that the first face 104, the second face 112, and the third face 116 orthogonally positioned can provide nearly constant gain over both azimuth and viewing zenith angles. Desirably, where the first sensor array 102 includes the first face 104, the second face 112, and the third face 116, the hemispherical coverage is nearly an entirety of the hemispherical space.

Figure 1B:
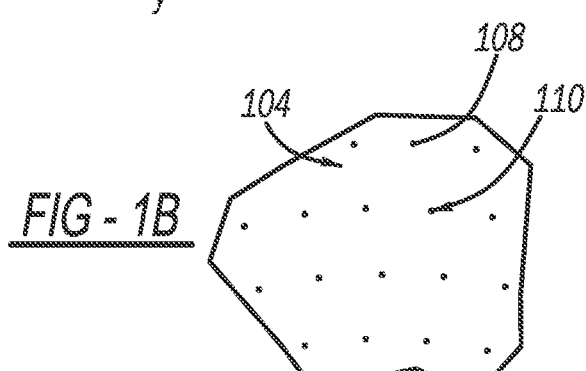
FIG. 1B is an enlarged view of the system shown in FIG. 1A, and further showing a plurality of elements arranged in an aperiodic lattice.

With reference to FIG. 1A, the first face 104, the second face 112, and the third face 116 can be disposed in a trirectangular tetrahedron configuration 120 with a first base.

Figure 3:
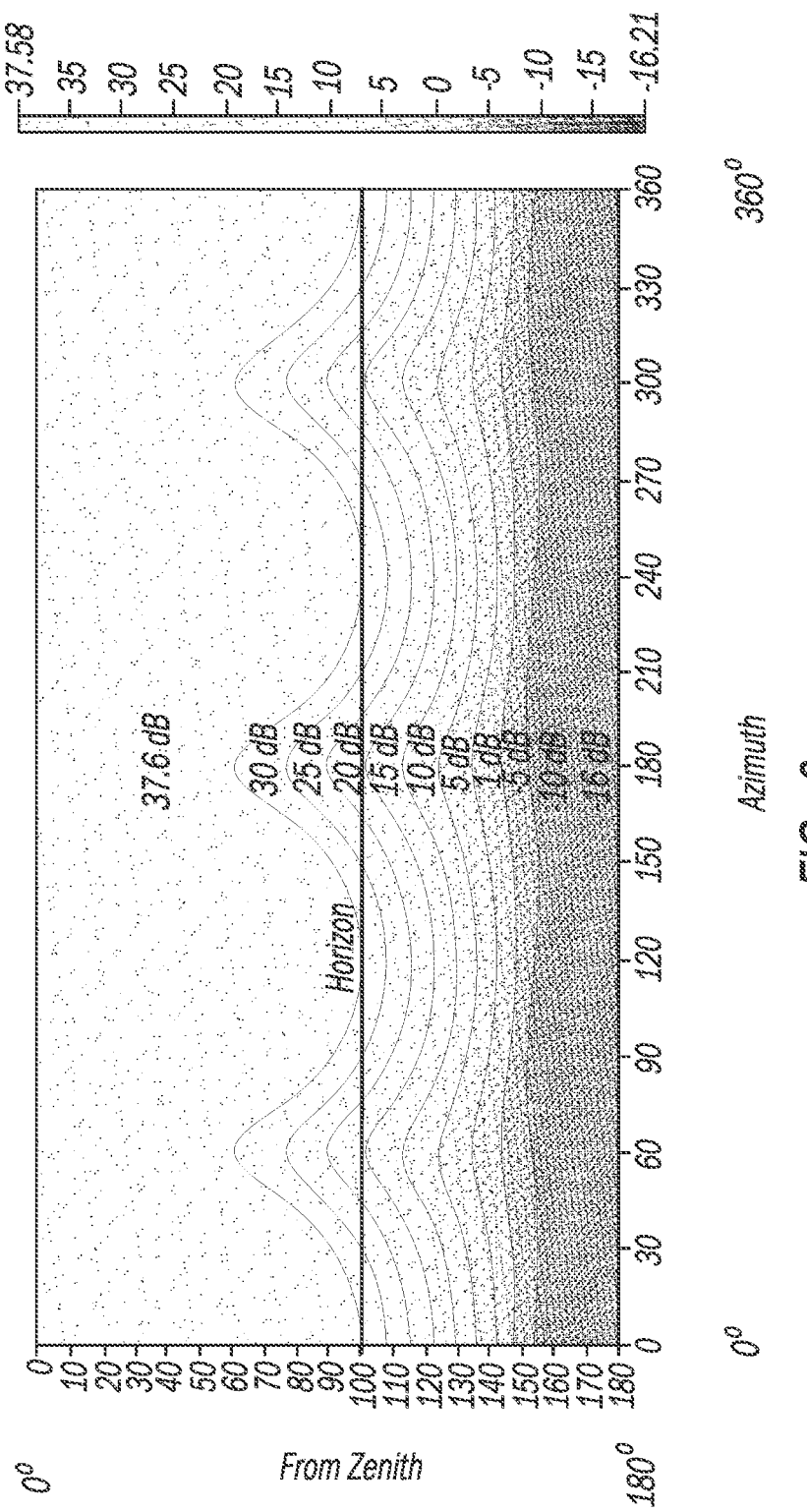
FIG. 3 is a Cartesian graph illustrating hemispherical coverage of the system, according to one embodiment, and further showing nearly constant gain with wide hemispherical coverage.

Therefore, at a top vertex of the tri rectangular tetrahedron, all faces 104, 112, 116 have face angles that are right angles. It should be appreciated that FIG. 1A is a three-dimensional (3D) graphic depiction of the system 100 in the tri rectangular tetrahedron configuration 120. The coordinates are expressed in wavelengths. The tri rectangular tetrahedron configuration 120 can provide hemispherical coverage with substantially constant gain, including across edges of the each of the faces 104, 112, 116. For example, FIG. 3 shows the nearly hemispherical coverage of the first sensor array 102 in the tri rectangular tetrahedron configuration 120 with 950 elements 108, 108b, 108c per face 104, 112, 116 at 10 Ghz.

Since the gain is nearly constant with scan, a boresight gain of one of the faces 104, 112, 116 is also the gain of the entire trirectangular tetrahedron configuration 120. The tri-rectangular tetrahedron configuration 120 can have a wide-band coverage (1 octave: e.g., 10 Ghz to 20 Ghz). The trirectangular tetrahedron configuration 120 can also provide substantially constant gain with a scan from 0° to 360° azimuth. With the trirectangular tetrahedron configuration 120, the first face 104, the second face 112 and the third face 116 can intersect at a point, the apex of the trirectangular tetrahedron configuration 120. The combination of the first face 104, the second face 112, and the third face 116 can have a polar axis perpendicular to the base of the tetrahedral and passing through the apex. Azimuth angles, $\phi$, proceeds around the base.

Obtaining constant gain with scan angle requires proper weighting of face inputs for each of the first face 104, the second face 112, and the third face 116. For a particular beam, a subarray output can be formed for each of the faces 104, 112, 116. Then, the faces 104, 112, 116 can be optimally weighted, which inherently can produce nearly constant gain output. Voltage response of the face 104, 112, 116 is proportional to cosine and sine. When weighted for optimum signal-to-nose radio (SNR), the response is $(\cos^2+\sin^2)$. Desirably, the system 100 works in three-dimensions if element response is uniform in azimuth.

As a non-limiting example, consider if there are 950 elements 108, 108b, and 108c per face 104, 112, 116. The gain of the system 100 in the trirectangular tetrahedron configuration 120 would be G=10*log(950*6)=37.55 db. However, it should be appreciated that a skilled artisan can scale the number of elements 108, 108b, 108c per face 104, 112, 116, and employ a different deterministic aperiodic lattice, within the scope of this disclosure.

For illustration purposes, we will consider a case where only the first face 104 and the second face 112 are excited (such as when the third face 116 is not illuminated and thus should be zero weighted). All of the plurality of first elements 108 and the plurality of second elements 108b will have a common signal arrival angle. For convenience, a subarray beam is formed for each face 104, 112, 116. A three-term input signal vector from the first face 104, the second face 112, and the third face 116 with N elements each is then $$\vec{x}(t)=[ANm(t)\cos(\theta1)v_1, ANm(t)\sin(\theta)v_2(0)v_3]+\sqrt{N}[\rho_1(t)\rho_2(t)\rho_3(t)]$$

Where A is signal amplitude and m(t) is normalized signal modulation, where $E[m^*(t)m(t)]=1$. Complex phasing of the terms is given by $v_i=e^{j\omega\tau_i}$. Uncorrelated Gaussian noise, $\rho(t)$ is also present in each input. This noise adds incoherently to produce a Gaussian output at the subarray level with power proportional to N. Since the elements 108, 108b, 108c have a $\cos^2(\theta)$ gain (power) pattern, the subarray voltages are proportional to the square root of gain.

Optimum array-weighting factor W is known to be $$W = R_\rho^{-1} V$$

Where $R_\rho^{-1}$ is the inverse of the noise covariance matrix and V is the signal steering vector. In the absence of interference and equal noise power from each input, noise covariance is simply $$R_\rho^{-1} = \frac{1}{\rho_0^2} I$$

By inspection, normalized signal steering vector is $$\vec{V} = [\cos(\theta)v_1 \ \sin(\theta)v_2 \ 0]$$

Then optimum array output y(t) is given by $$y(t) = \overline{W}^H \vec{x}(t) = \frac{1}{\rho_0^2} \vec{V}^H \vec{x}(t)$$

Substituting and noting that the phasing terms times their conjugate is unity, $v_i^* v_i = 1$, gives $$y(t) = \frac{ANm(t)}{\rho_0^2}[\cos^2(\theta) + \sin^2(\theta) + 0] + \frac{V^H \vec{\rho}(t)}{\rho_0^2}$$

$$y(t) = \frac{ANm(t)}{\rho_0^2} + \frac{V^H \vec{\rho}(t)}{\rho_0^2}$$

This analysis shows that irrespective of the signal angle of arrival, optimum weighting of the orthogonal face inputs provides a signal output voltage proportional to the number of elements per face, N.

Since the array voltage output is proportional to N, it is notable that output signal POWER is proportional to $N^2$. This active array (LNA per element) result is well known, but not widely appreciated.

As for signal-to-noise power ratio and 'array gain', evaluation of the expected value array noise power output shows that it is proportional to N. We have $$P_{ny} = E\{\overline{W}^H \vec{\rho}(t)\vec{\rho}^H(t)W\} = \overline{V}^H E\{\vec{\rho}(t)\vec{\rho}^H\}\vec{V} =$$

$$\vec{V}^H \{(\sqrt{N})^2 \rho_0^2 I\}\vec{V} = N[\cos^2(\theta) + \sin^2(\theta) + 0]\rho_0^2 = N\rho_0^2$$

Consequently, as expected, the array output SNR and thus receive antenna 'gain' is proportional to N.

$$SNR = \frac{A^2 N^2}{N\rho_0^2} = N\frac{A^2}{\rho_0^2}$$

Figure 4:
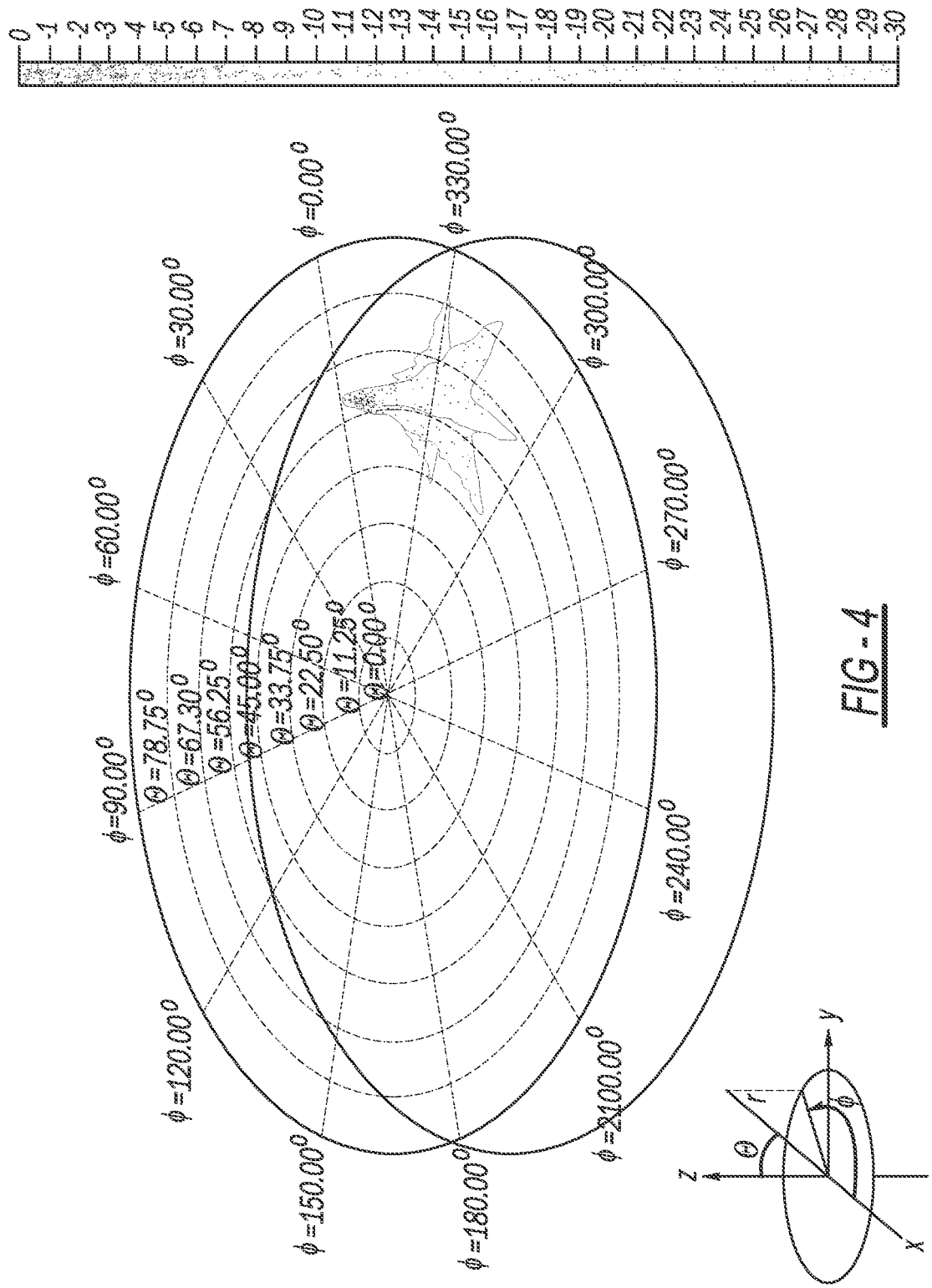
FIG. 4 is a 3D polar graph showing an array pattern of the system, according to one embodiment, and further showing a peak at 30° from zenith and an azimuth of 0°.
Figure 5:
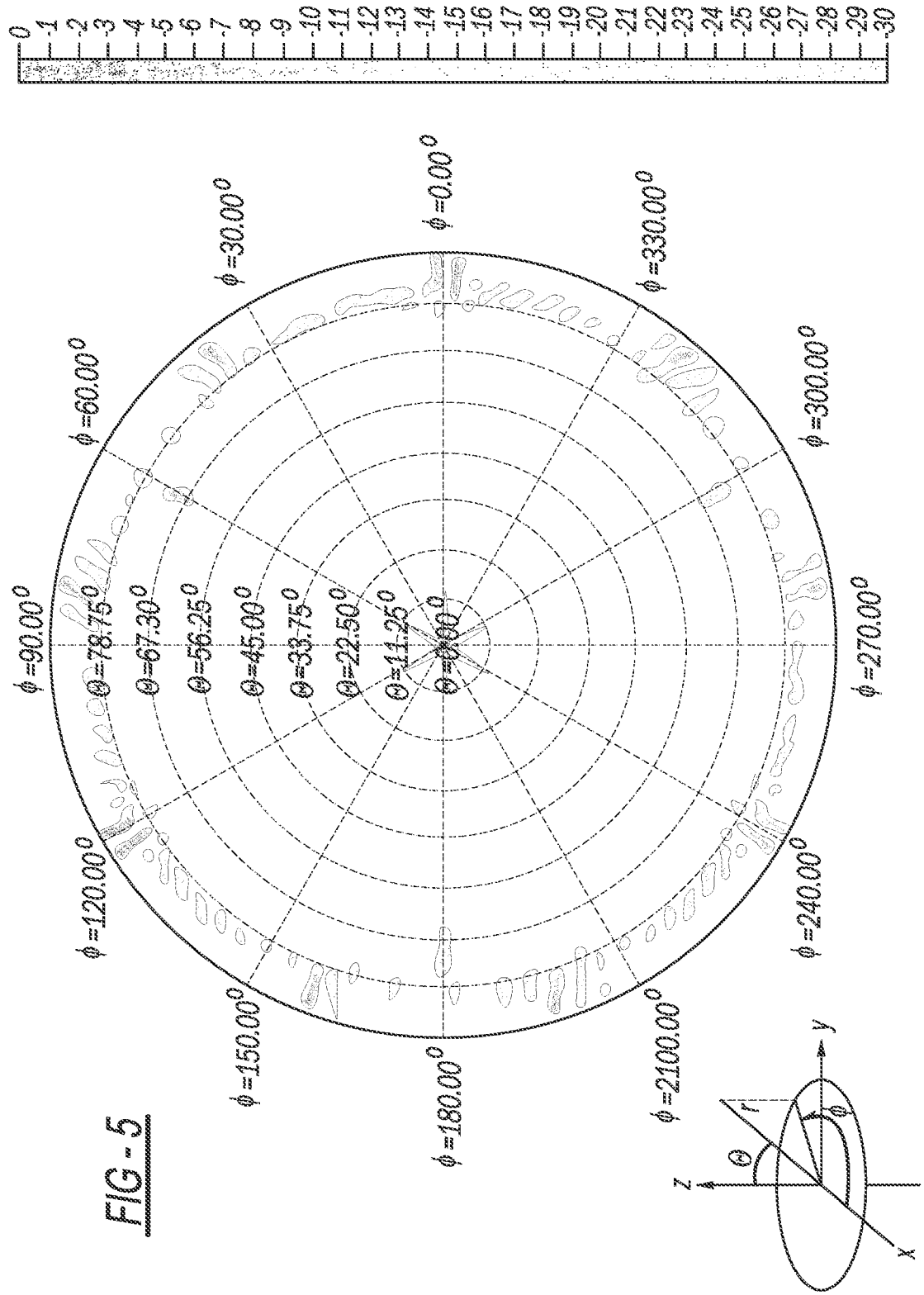
FIG. 5 is a 3D polar graph showing the array pattern of the system, according to one embodiment, and further showing the peak at 90° from zenith and an azimuth of 0°.
Figure 7:
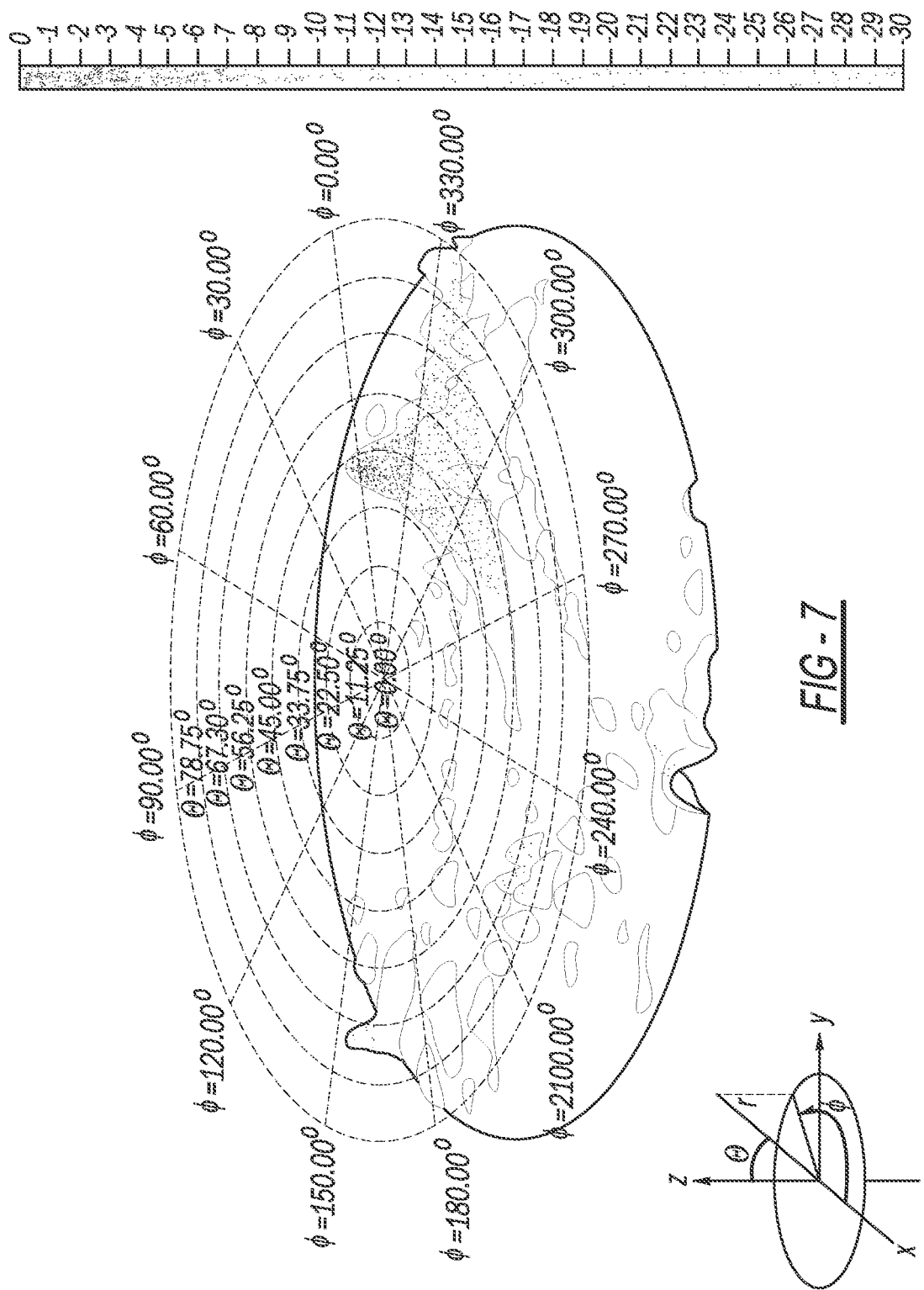
FIG. 7 is a 3D polar graph showing the array pattern of the system having 80 elements per face, and further showing the peak at 45° from zenith and an azimuth of 0°.
Figure 8:
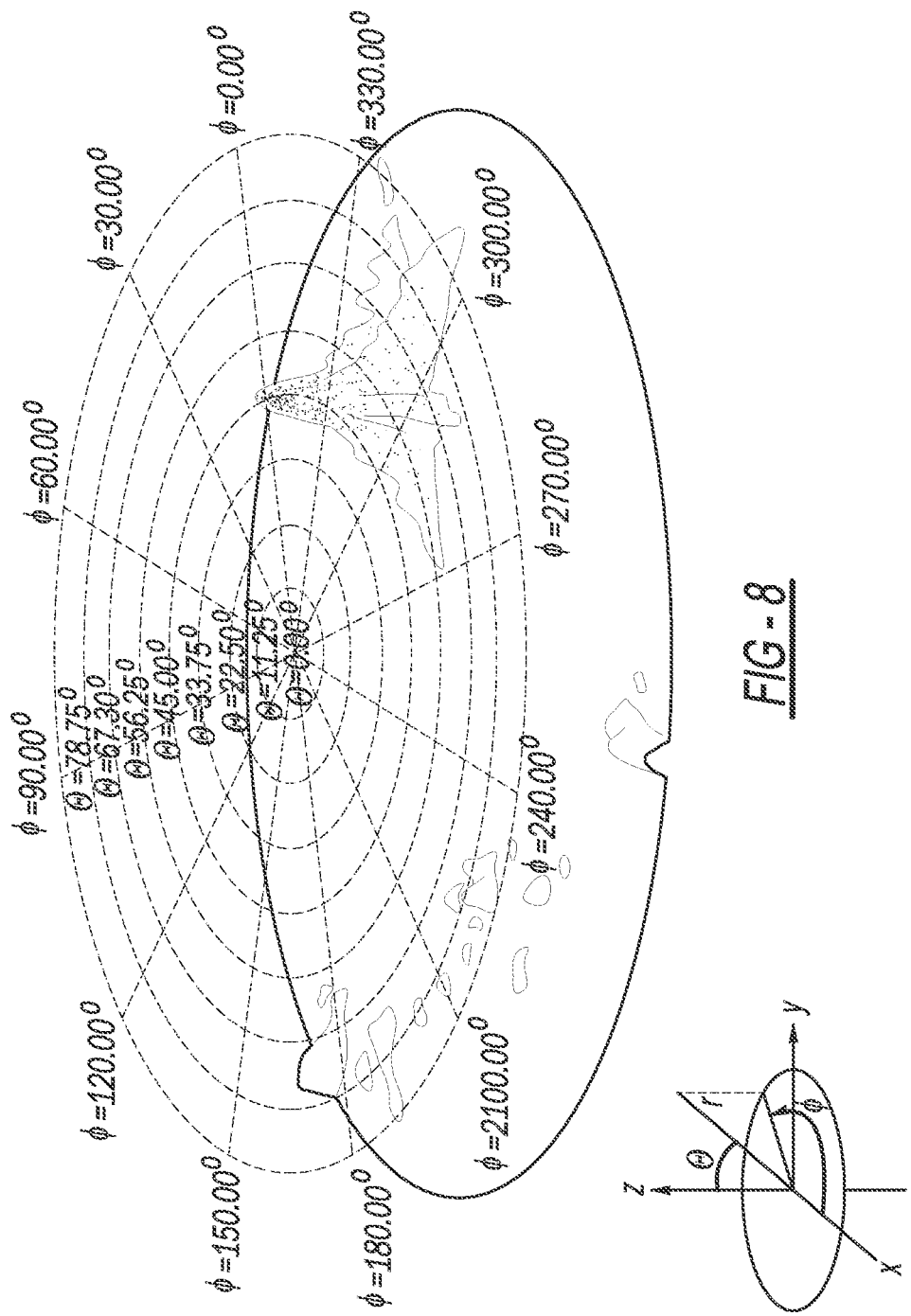
FIG. 8 is a 3D polar graph showing the array pattern of the system having 220 elements per face with the peak at 45° from zenith and an azimuth of 0°.
Figure 9:
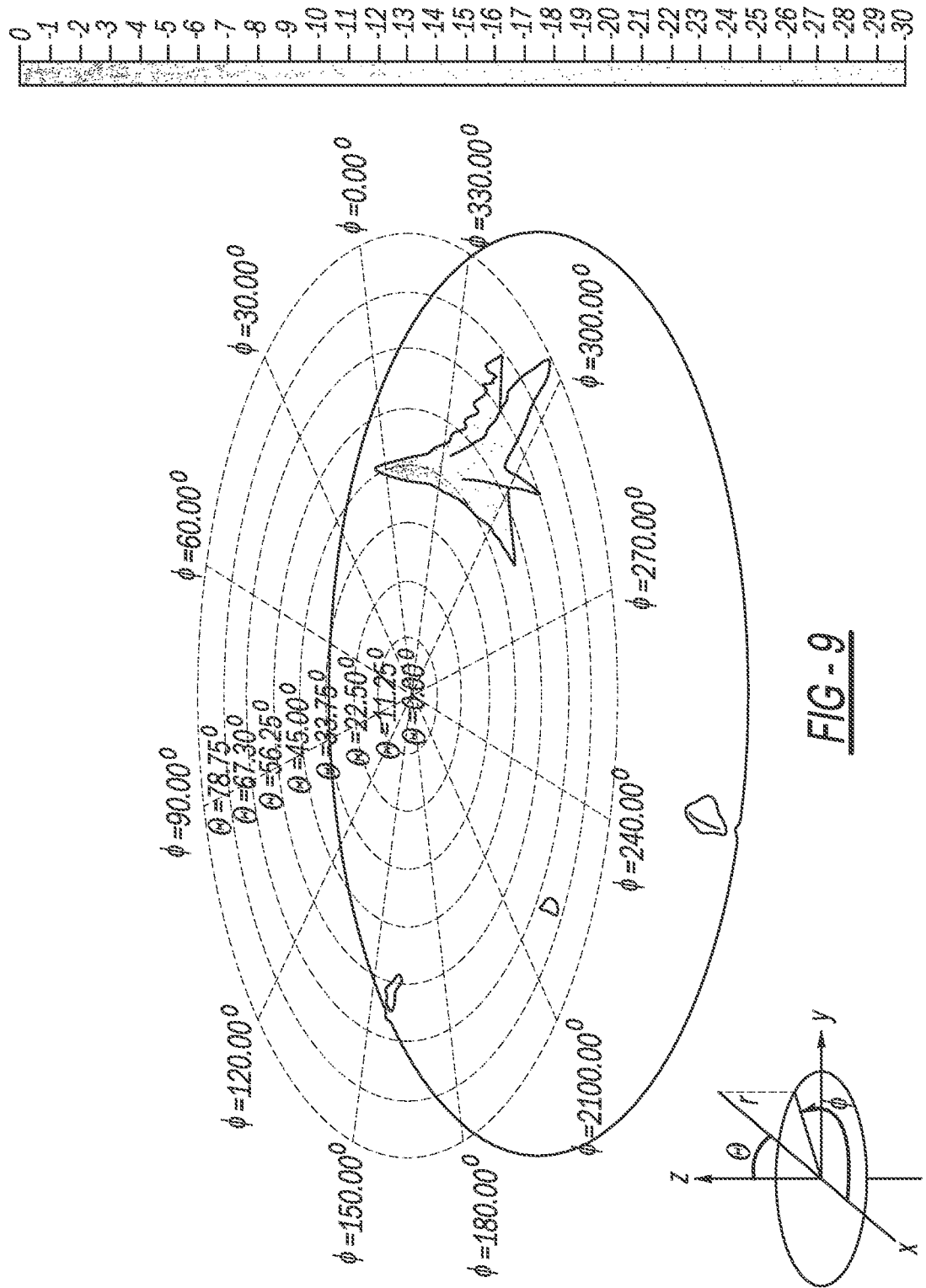
FIG. 9 is a 3D polar graph showing the array pattern of the system having 600 elements per face with the peak at 45° from zenith and an azimuth of 0°.

As shown in FIGS. 4-9, array patterns generated by the system 100 are shown. The peak gain has been normalized to 0 dB. With reference to FIG. 4, a peak of the array pattern is shown at an 30° from zenith and an azimuth of 0°. In this array pattern hundreds of the elements 108, 108b, 108c are on each of the faces 104, 112, 116 of the first sensor array 102. With respect to FIG. 5, the peak of the array pattern is shown at an 90° from zenith and an azimuth of 0°. Now referring to FIG. 6, the peak of the array pattern is shown at 90° from zenith and an azimuth of 0°. It should be appreciated that the more elements 108, 108b, 108c, the "cleaner" the pattern. For example, FIG. 7 shows the peak of the array pattern at 45° from zenith and an azimuth of 0° with the system 100 having only about eighty (80) elements 108, 108b, 108c per face 104, 112, 116. It can be observed that the main lobe is wide and has defined side lobes. Now referring to FIG. 8, the peak of the array pattern at 45° from zenith and an azimuth of 0° with the system 100 having about two hundred and twenty (220) elements 108, 108b, 108c per face 104, 112, 116. It can be observed that the main lobe has become narrower and the side lobes have become diminished, as the number of the elements 108, 108b, 108c increased. In regard to FIG. 9, the peak of the array pattern at 45° from zenith and an azimuth 0° with the system 100 having about six hundred (600) elements 108, 108b, 108c per face 104, 112, 116. It can be observed that the main lobe is even narrower, and the side lobes have become even more diminished, as the number of elements 108, 108b, 108c increased.

Figure 10:
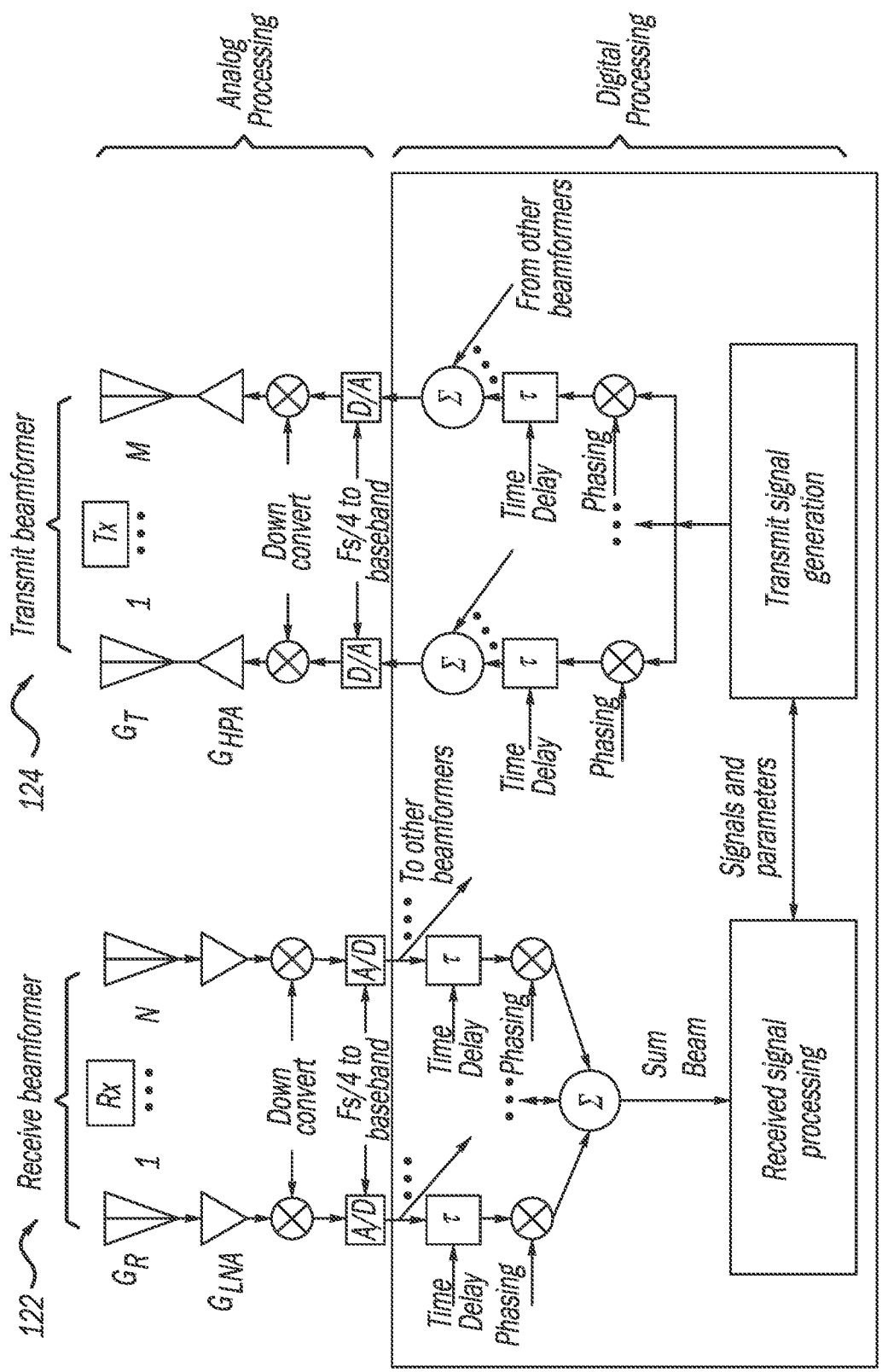
FIG. 10 is a notional signal flow of a receive beamformer unit and a transmit beamformer unit, and further showing the analog processing and digital processing.

With reference to FIG. 10, the system 100 can include a receive beamformer module 122 and a transmit beamformer module 124. Both the receive beamformer module 122 and the transmit beamformer module 124 can include an analog processing unit and a digital processing unit. The analog processing unit of the receive beamformer module 122 can include receiving an incoming signal from one of the elements 108, 108b, 108c. Each of the elements 108, 108b, 108c that is receiving has a gain $G_R$. The incoming signal can be sent to a low noise amplifier (LNA). The LNA can have a gain $G_{LNA}$. A mixer (multiplier) can beat a local oscillator (LO)-signal with the incoming signal, thus down converting the incoming signal to baseband (nominally zero frequency, DC). The incoming signal can be sent through an analog-to-digital converter (A/D). The A/D converter can have a sampling frequency, fs. The fs must be fast enough to satisfy Nyquist for the bandwidth of interest. The converted signal can then be sent to the digital processing unit of the receive beamformer module 122. The digital processing unit of the receive beamformer module 122 can include sending the converted signal through a variable time delay (denoted as the tau). The delayed signal can be "weighted" by complex multipliers, thereby producing a Rx beam. The Rx beam can be pointed by time-delay adjusting the signals from each of the elements 108, 108b, 108c, with a precise weighting at the phase shift multipliers. Signals detected in the Rx beam can be sent to a received signal processing unit. The received signal processing unit can include receivers for demodulation of signals, processing to analyze signal content and properties. The output with parameters of the received signal processing unit can be sent to the transmitter signal generation unit, for transmitting applications, such as a transponder application. The parameters can include pointing angles for transmitting or an angle to be examined such as for radar applications. The digital processing unit of the transmit beamformer module 124 can include phase shifting the signals by complex multipliers, as appropriate for fine correction at each of the elements 108, 108b, 108c. The signal can then be time delayed so that it will go out in phase and time aligned from each of the elements 108, 108b, 108c. Similarly, generated signals from all the other simultaneous transmit beamformers (not shown) are combined. It should be appreciated that this is feasible since the various other signals are not correlated, so the beams will form linearly and independently. The signals are converted to analog signals through a digital-to-analog (D/A) converter in the analog processing unit of the transmit beamformer module 124. A mixer can up convert the signal, which can be amplified by the gain of the high-power amplifier $G_{HPA}$.

Figures 13, 14:
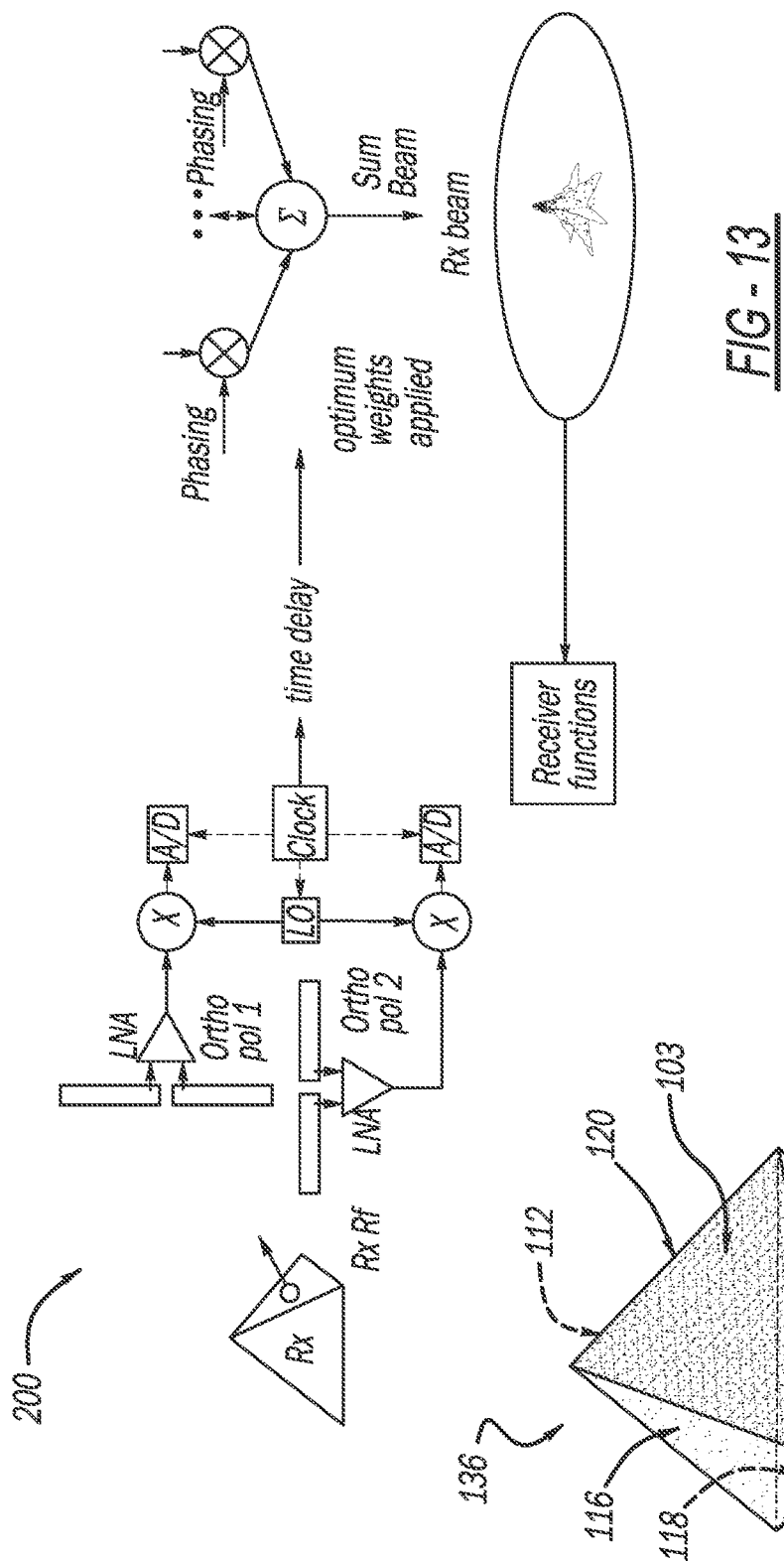
FIG. 13 is a notional signal flow of a method of a SIGINT application being performed by the system.
FIG. 14 is a front perspective view of a double trirectangular tetrahedron, the double trirectangular tetrahedron including the trirectangular tetrahedron and another trirectangular tetrahedron.

The system 100 can be configured to be used in SIGINT applications, as shown in FIG. 13. The system 100 can generate multiple independent Rx beams. The system 100 can be configured to track the multiple independent Rx beams for incoming signals when the incoming signals are detected.

While still referring to FIG. 13, a notional signal flow illustrates a method 200 for using the system 100 in a SIGINT application is shown. The method 200 includes time delaying incoming signals from the elements 108, 108b, 108c. The time delayed incoming signal be can be phase shifted. The phase shifted incoming signal can be summed, thereby producing a Rx beam. A receiver can bandwidth limit, and otherwise process signals that are found in the Rx beam.

In certain examples, the system 100 can be configured to detect an incoming signal, receive the incoming signal with a matched polarization optimum beam, and determine the angle of arrival (AOA). It has been shown that one of the fastest ways to respond to an incoming signal is to form a beam in its direction of arrival until enough samples are collected for a precision AOA calculation. This is true even if the incoming signal is an interference that needs to be suppressed in subsequent beamforming.

The signal can be received at all of the elements 108, 108b, 108c on all of the faces 104, 112, 116 within the field of view. The elements 108, 108b, 108c can be partitioned into subarrays. Optimum weights can be applied, and the subarray outputs can be summed forming coherent receive beams on each incoming signal. Using a variety of possible Blind Signal Sorting, BSS, algorithms the number of signals, received power, and steering vectors of all co-channel signals in that beam's AOA vicinity can be determined. With the steering vector of the incoming signal and covariance matrix inverse, an optimum beam (including polarization matching and co-channel interference nulling) can be formed. Additionally, the steering vector of the incoming signal can then be correlated with the calibrated array manifold to determine its AOA. It should be appreciated that these identified methods do not require any prior signal waveform or center frequency knowledge.

Figure 11:
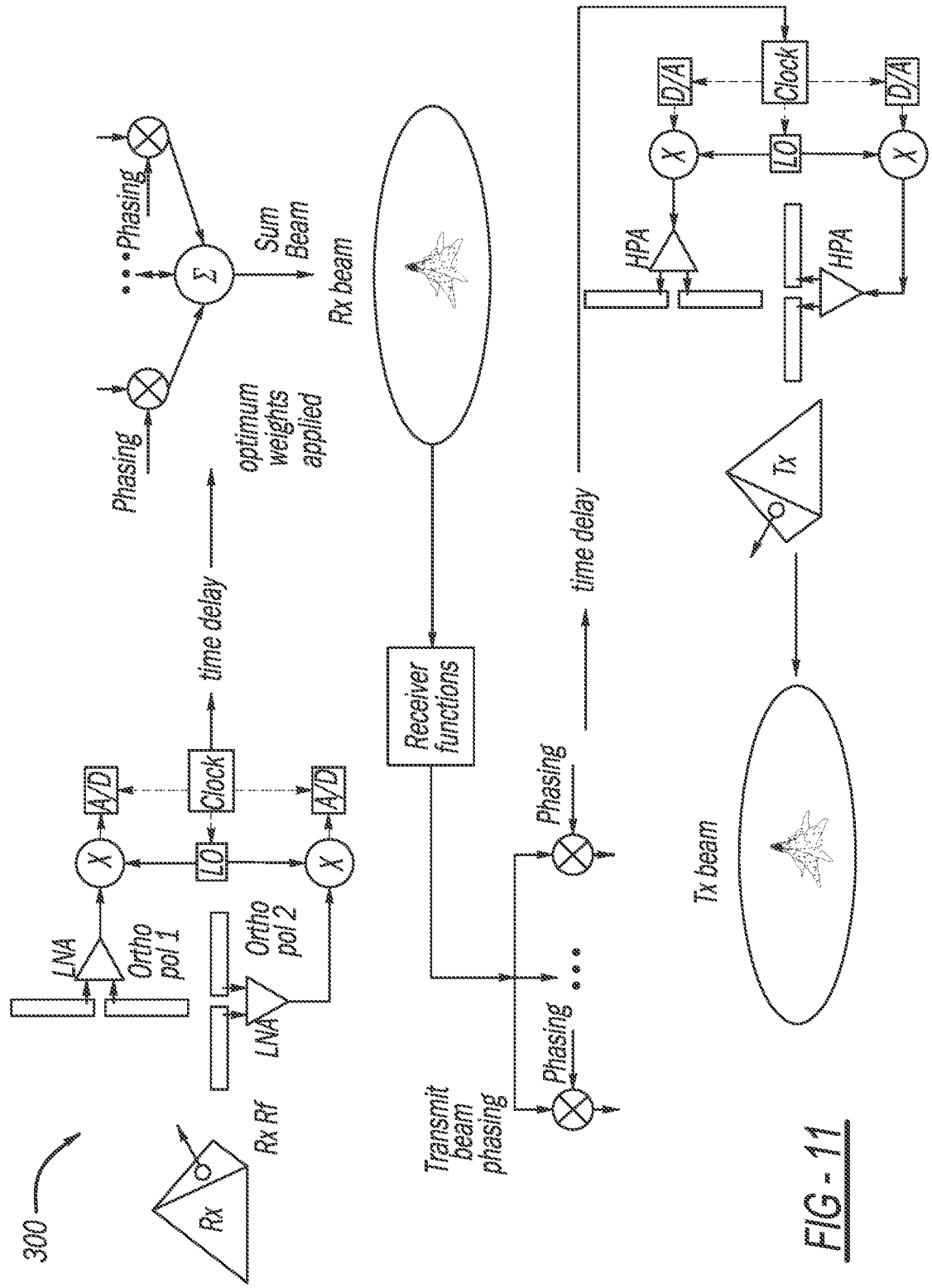
FIG. 11 is a notional signal flow of a method of performing a transponder application being performed by the system.

The system 100 can be configured to be used in a transponder application, as shown in FIG. 11. The system 100 can be configured to generate receive beams for as many of the incoming signals that are expected. The system 100 can also be configured to generate a transmit beam for every receive beam. In certain examples, the receiving and transmitting functions are performed by separate sensor arrays in the trirectangular tetrahedron configuration 120. The received signals can be forwarded to any selected location at a selected frequency. The selected frequency can be any arbitrary frequency. In certain examples, the selected frequency is the frequency of the incoming signal, or in other words the return frequency. The selected location can include any location where the user would like to broadcast the received signal. A non-limiting example includes an origin of the incoming signal. This can be done by determining the AOA through the SIGINT application. The AOA can then be used with transmit array calibration to obtain a transmit beam steering vector at the desired return frequency. The optimum received signal can be multiplied by the transmit beam steering vector and distributed to the elements 108, 108b, 108c of the faces 104, 112, 116. It should be appreciated that although this process is similar to that of a retrodirective array, it does not use any retrodirective principals. The received signal can be delivered to any location in the hemisphere (via AOA). The received signal can also be delivered at any frequency providing that the received signal embeds a preamble with destination and frequency specification, or if the information is provided a priori.

While still referring to FIG. 11, a notional signal flow illustrates a method 300 for using the system 100 in a transponder application. The method includes time delaying signals from one of the elements 108, 108b, 108c. The time delayed signals can be phased shifted. The phase shifted signals can be summed, thereby producing a Rx beam output. A receiver can bandwidth limit, and otherwise process signals found in the Rx beam output. The processed signals can be phased shifted. The phase shifted processed signal can be time delayed. The time delayed processed signal can be sent to one of the elements 108, 108b, 108c (which can be dual polarized) to generate a Tx beam.

Figure 12:
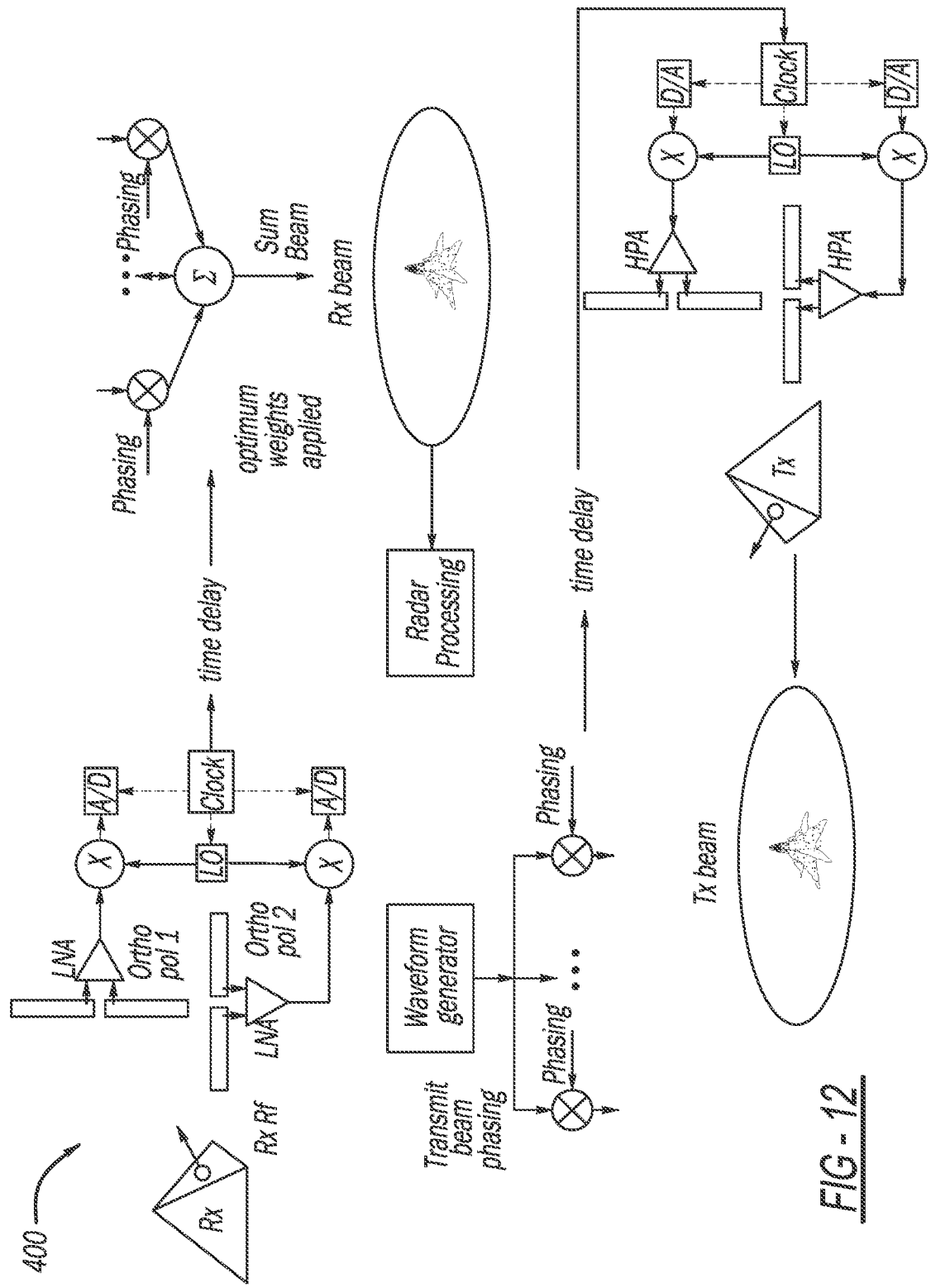
FIG. 12 is a notional signal flow of a method of a radar application being performed by the system.

Now referring to FIG. 12, the system 100 can be configured to be used in a radar application. The system 100 can be configured to generate radar transmissions. The system 100 can also be configured to listen for echoes from the radar transmissions. The system 100 can be further configured to process the return signals received. It should be appreciated that multiple simultaneous beam pairs are possible.

While still referencing FIG. 12, a notional signal flow illustrates a method 400 for using the system 100 in a radar application. The waveform generator produces predefined waveform signals. The predefined waveform signals can be phased shifted. The phased shifted waveform signals can be time delayed. The time delayed waveform signals can be sent to one of the elements 108, 108b, 108c to generate a Tx beam. Signals from one of the elements 108, 108b, 108c can be time delayed. The time delayed signals can be phased shifted. The phase shifted signals can be summed, thereby producing a Rx beam. The signals found in the Rx beam can be processed.

In certain examples, the system 100 can include a plurality of independently steerable receive beams. With low noise preamplification and A/D conversion, receive element signals can be losslessly distributed to any number of beamformers. These inputs can be further processed adaptively on a localized subarray basis, with an arbitrary number of angularly nearby beam inputs, to provide near optimum reception of a multitude of simultaneous signals. As was noted earlier, the signal power from the beamformers is proportional to $N^2$.

Great flexibility in array output beam formation, maximum EIRP, and spatial coverage can be achieved by digitally routing signals output from the receive beamformers to arbitrary groups of weighted transmit elements 108, 108b, 108c on the faces 104, 112, 116 of each of the first face 104, the second face 112, and the third face 116.

In this way, elements 108, 108b, 108c that cannot significantly contribute to the transmit beam (such as those on a side not facing the return direction) can be held in reserve or used for a different return beam. Only as many elements 108, 108b, 108c as needed for return EIRP are activated.

While it is theoretically tolerable (assuming perfect linearity) to share transmit HPA's and antennas for all of the return signals if they are uncorrelated, this can be practically infeasible due to amplifier saturation and intermodulation distortion. Since in any case limited HPA output power must be apportioned to the several returned signals, the present technology can achieve this by selectively assigning elements 108, 108b, 108c and their associated HPA to a single specific return beam. This can also be done with selective weighting.

In another example, assume a return direction along the apex of the tetrahedron where all elements 108, 108b, 108c have equal visibility. Suppose one of these signals needs high EIRP while the other does not. Some fraction, f, of the elements 108, 108b, 108c on each face 104, 112, 116 could be devoted to second beam and the remaining majority to first beam. Since transmit EIRP for an array of this type is proportional to the number of elements 108, 108b, 108c squared, maximum available EIRP from second beam would be reduced by $f^2$ while first beam would retain $(1-f)^2$. Consider that f=0.1, then second beam maximum EIRP is reduced by 20 dB while first beam maximum EIRP is reduced by less than 1 dB. Partitioning for sidelobe control or reduction of radiation in certain directions is also feasible with this dynamic apportioning of transmit chains with adaptive weighting.

Figure 15:
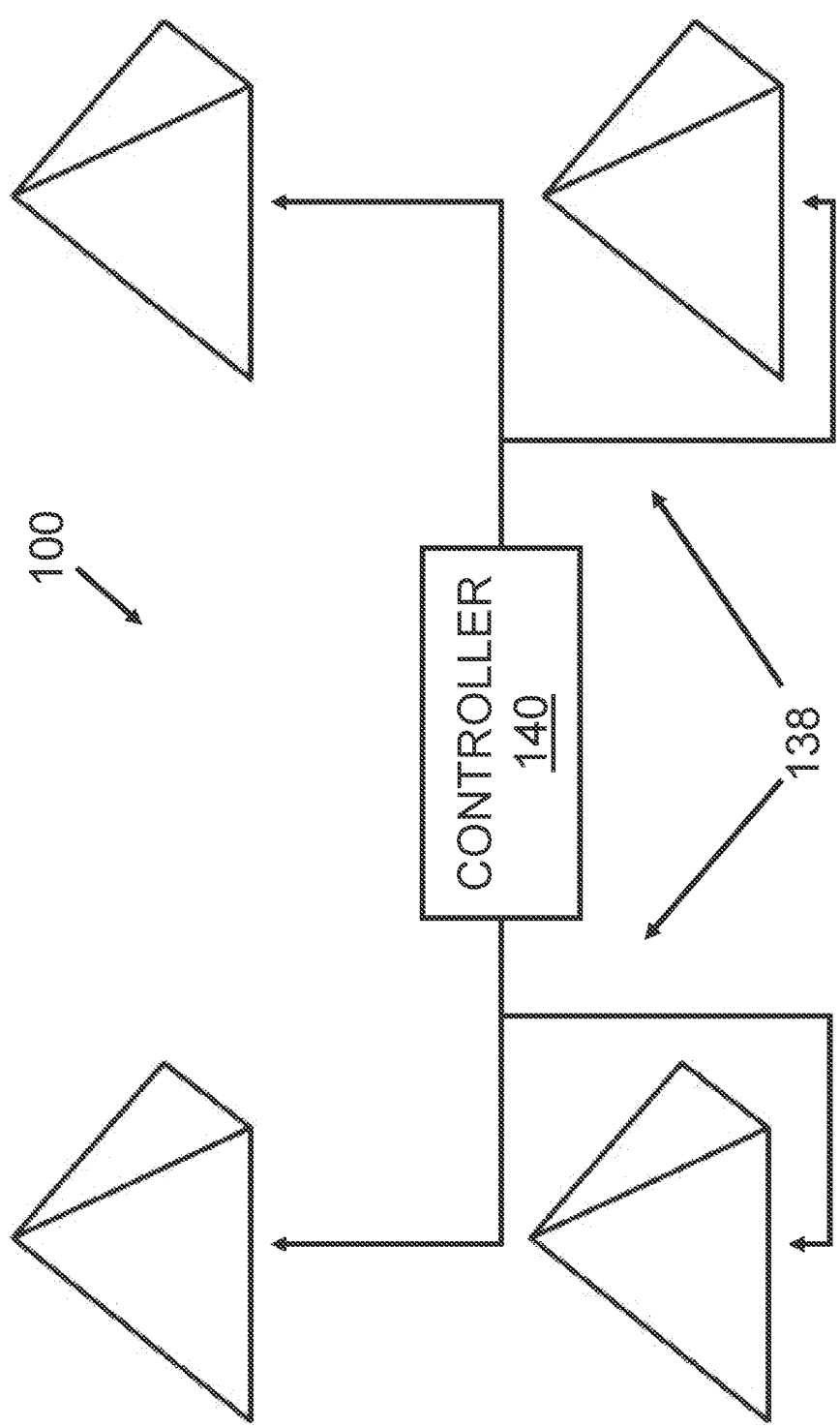
FIG. 15 is a schematic illustrating the system having an array of tetrahedrons.

In a further embodiment, the first sensor array 102 can be combined with one or more sensor arrays by coherently combining signals, thereby forming an array of tetrahedrons 138, as shown in FIG. 15. The array of tetrahedrons can perform at least one transmit and receive function. All of the tetrahedron arrays require that time delay and phasing parameters be applied in order to realize the various transmit and receive beams. While still referring to FIG. 15, a controller 140 can be required to produce values for these parameters. For example, to steer a beam in a particular direction, the path differences from each of the elements to a common phase reference plane orthogonal to the AOA vector. Using the speed of light, these path differences are expressed as time delays. This process applies both to the trirectangular tetrahedron configuration 120 and the array of tetrahedron 138, and is basically the same for each. The elements positions are known by manufacturing specifications and, if necessary, calibration measurements. Precision beam formation and tracking functions are applied when the various subarrays are combined, using, for example, Blind Signal Sorting algorithms for steering vector phase determination. In addition to these beam steering computations, the controller 140 executes logic for functions specific to an application, for example a procedure for scanning the hemispherical space for signals of interest in a SIGINT application. If a transponder application, the controller redirects the received signal to whatever AOA destination and frequency is appropriate.

In a further embodiment, the first sensor array 102 can include a fourth face 126, a fifth face 128, and a sixth face 130. Each of the faces 126, 128, 130 can be identical or similar in function to the faces 104, 112, 116. Each of the faces 126, 128, 130 can be arranged in a another trirectangular tetrahedron configuration 132 that has a second base 134. The other trirectangular tetrahedron configuration 132 can be disposed inverted in relation to the trirectangular tetrahedron 120, thereby forming a double trirectangular tetrahedron 136.

In certain examples, the second base 134 of the other trirectangular tetrahedron configuration 132 can face and be adjacent to the first base 118 of the trirectangular tetrahedron configuration 120, as shown in FIG. 14. It should be appreciated that one skilled in the art can employ other methods and structure for attaching the trirectangular tetrahedron configuration 120 and the other trirectangular tetrahedron configuration 132. Desirably, this configuration can provide nearly constant gain with spherical coverage of space (compared to the hemispherical coverage provided by just the trirectangular tetrahedron configuration 120 alone). In certain examples, the double trirectangular tetrahedron 136 can be mounted on different surfaces, such as a tower and an airborne platform. However, it should be appreciated that a skilled artisan can mount the double trirectangular tetrahedron in different locations, as desired.

Advantageously, the system 100 can provide substantially constant gain with hemispherical coverage. In particular, the substantially cosine-squared power pattern of the elements 108, 108b, 108c of each of the faces 104, 112, 116 can provide nearly constant gain. Also, having the first face 104, the second face 112, and the third face 116 in a trirectangular tetrahedron configuration 120 can permit for the hemispherical coverage. The coverage can be two-thirds of the hemispherical space for two faces 104, 112 and nearly the entirety of the hemispherical space, if all three faces 104, 112, 116 are optimally combined. In addition, the system 100 can be used to perform several intelligence, defense and space-related applications, including communication, transponder, ECM, radar, and SIGINT applications.

Multiple widely-spaced tetrahedron antenna units can be coherently combined providing N squared EIRP increase for transmit units (or N gain increase for receive units) where N is the number of transmit tetrahedrons arrayed.

While certain representative embodiments and details have been shown for purposes of illustrating the invention, it will be apparent to those skilled in the art that various changes can be made without departing from the scope of the disclosure, which is further described in the following appended claims.

What is claimed is:

1. A system for monitoring a hemispherical space, comprising:
    a first sensor array configured to provide a hemispherical coverage, the first sensor array having a first face disposed orthogonal to a second face, the first face including a plurality of first elements arranged in a first aperiodic lattice, each of the first elements having a first substantially cosine-squared power pattern, the second face having a plurality of second elements arranged in a second aperiodic lattice, each of the second elements having a second substantially cosine-squared power pattern.

2. The system of claim 1, wherein at least one of the first aperiodic lattice and the second aperiodic lattice include a deterministic aperiodic lattice.

3. The system of claim 1, wherein at least one of the first aperiodic lattice and the second aperiodic lattice includes a random aperiodic lattice.

4. The system of claim 1, wherein each of the first elements and the second elements have an antenna pattern which can be expressed in terms of a first polar angle θ and a second polar angle φ, whereby θ is viewing zenith angle and φ is azimuth.

5. The system of claim 4, wherein the first substantially cosine-squared power pattern of each of the first elements of the first face is about $\cos^2(\theta)$.

6. The system of claim 5, wherein the second substantially cosine-squared power pattern of each of the second elements of the second face is about $\cos^2(\theta-\pi/2)$ relative to the first face.

7. The system of claim 6, wherein the first face and the second face provide a substantially constant gain with a scan over an edge between the first face and the second face.

8. The system of claim 7, wherein the hemispherical coverage is two-thirds of the hemispherical space.

9. The system of claim 1, wherein the first sensor array includes a third face having a plurality of third elements arranged in a third aperiodic lattice.

10. The system of claim 9, wherein the third face is disposed orthogonal to the first face and the second face.

11. The system of claim 10, wherein the hemispherical coverage is nearly an entirety of the hemispherical space.

12. The system of claim 10, wherein the first face, the second face, and the third face are in a trirectangular tetrahedron configuration.

13. The system of claim 1, further comprising a second sensor array having a plurality of faces in a trirectangular tetrahedron configuration.

14. The system of claim 13, wherein the second sensor array is configured to perform at least one of independent transmission functions and independent receiving functions.

15. The system of claim 13, wherein the second sensor array is coherently combined with the first sensor array to perform at least one of independent transmission function and independent receiving function.

16. The system of claim 12, furthering comprising a fourth face, a fifth face, and a sixth face arranged in another trirectangular tetrahedron configuration disposed inverted in relation to the trirectangular tetrahedron configuration, thereby permitting the system to provide nearly constant gain with spherical coverage of space.

17. The system of claim 1 configured for use in a transponder application, wherein the system is configured to generate a receive beam for at least one incoming signal and generate a corresponding transmit beam for each receive beam.

18. The system of claim 1 configured for use in a SIGnal INTelligence (SIGINT) application, wherein the system is configured to generate multiple independent receive beams for incoming signals and generate track beams for incoming signals when incoming signals are detected.

19. The system of claim 1 configured for use in a radar application, wherein the system is configured to generate a radar transmission, listen for echoes, and process a return signal.

20. A system for monitoring a hemispherical space, comprising:
    a system for monitoring the hemispherical space, the system including a first sensor array configured to provide a substantially constant gain across nearly an entirety of the hemispherical space, the first sensor array having a trirectangular tetrahedron configuration including:
    a first face having a plurality of first elements arranged in a first aperiodic lattice;
    a second face disposed orthogonal to the first face, the second face having a plurality of second elements arranged in a second aperiodic lattice; and
    a third face disposed orthogonal to the first face and the second face, the third face having a plurality of third elements arranged in a third aperiodic lattice;
    wherein each of the first elements, the second elements, and the third elements have an antenna pattern which can be expressed in terms of a first polar angle θ and a second polar angle φ, whereby θ is viewing zenith angle and φ is azimuth, and wherein each of the first elements have a $\cos^2(\theta)$ power pattern and each of the second elements have a $$\cos^2\left(\theta-\frac{\pi}{2}\right)$$

power pattern relative to the first face.

* * * * *